(No Model.)
E. A. SPERRY.
POWER TRANSMITTING GEARING FOR ELECTRIC RAILWAY TRUCKS.
No. 565,938. Patented Aug. 18, 1896.
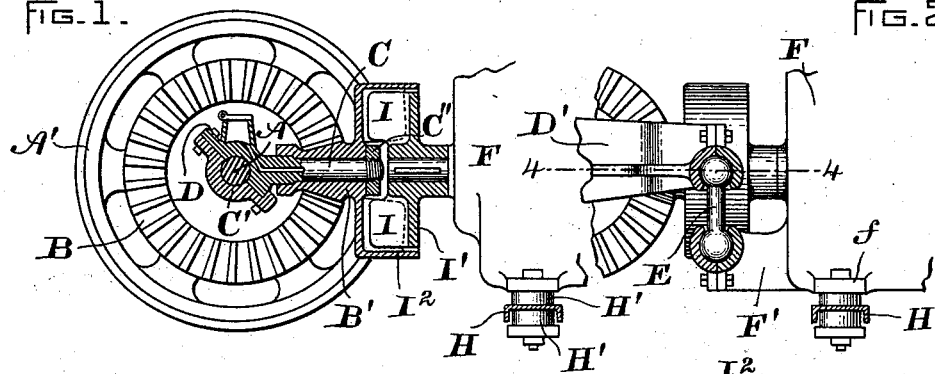
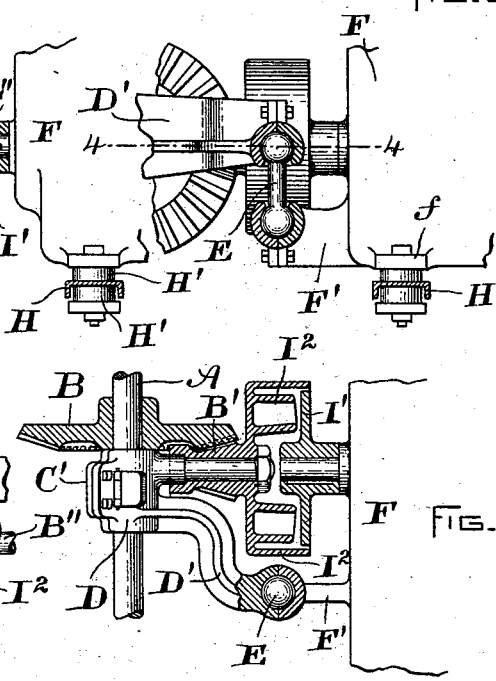
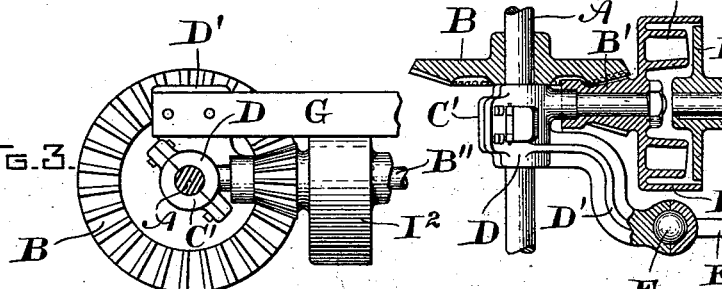
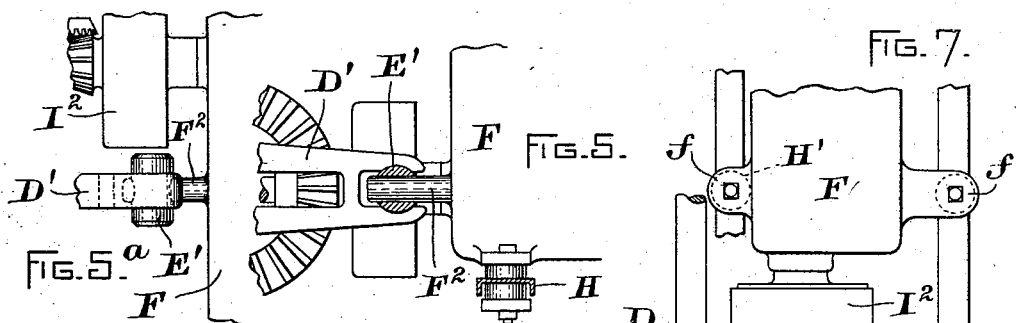
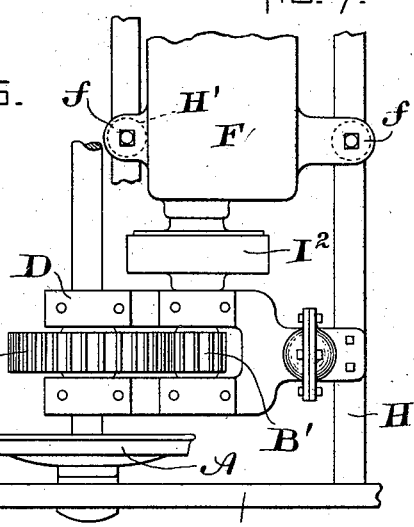
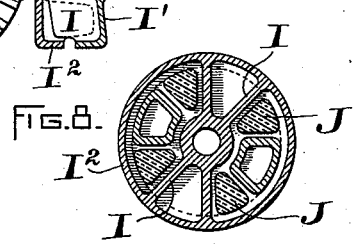
WITNESSES.
A. H. Abell.
A. F. Macdonald
INVENTOR.
Elmer A. Sperry, by
Geo. R. Blodgett,
atty.

UNITED STATES PATENT OFFICE.

ELMER A. SPERRY, OF CLEVELAND, OHIO, ASSIGNOR TO THE GENERAL ELECTRIC COMPANY, OF NEW YORK.

POWER-TRANSMITTING GEARING FOR ELECTRIC-RAILWAY TRUCKS.

SPECIFICATION forming part of Letters Patent No. 565,938, dated August 18, 1896.

Application filed April 13, 1896. Serial No. 587,333. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Power-Transmitting Gearing for Electric-Railway Trucks, of which the following is a specification.

My invention relates to devices for transmitting power from one shaft to another where the shafts are free to move relatively, as, for instance, in communicating power from a motor to the axles of a vehicle.

The invention consists in means for coupling the adjacent ends of abutting or nearly-abutting shafts, one being a driving-shaft and the other a driven shaft geared to the axle; in means for supporting on the motor or motor-support one end of the bracket in which the gears are journaled, and in other details of construction, all of which are hereinafter set forth, and particularly pointed out in the claims.

In the accompanying drawings, Figure 1 is a sectional elevation of a power-transmitting device embodying my invention. Fig. 2 is a similar view showing other portions of the device. Fig. 3 is an end elevation of the same. Fig. 4 is a top plan view. Fig. 5 shows a modification. Fig. 5ª is a detail of a portion of Fig. 5. Fig. 6 is a sectional elevation of another modification. Fig. 7 is a plan view of a further modification, showing the two shafts parallel and not in alinement. Fig. 8 is a cross-section of a coupling device.

Upon a shaft A, which may be a car-axle carrying car-wheels A', is mounted the gear-wheel B, preferably a bevel-gear meshing with a bevel-pinion B', which has a tubular hub sleeved upon a stationary stud C, integral with a bracket D, containing a half-bearing fitting upon the shaft A and retained in place by a cap C', bolted to the bearing D, and containing a half-bearing fitting the opposite side of the shaft. The end of the stud is provided with a screw-thread to receive a nut C'', which serves to retain the pinion in place upon the stud. In some cases the pinion may be secured upon a shaft B''.

The bracket D is prevented from rotating with the shaft by means of an arm D', extending, preferably, parallel with the stud C and having its end flexibly connected with the motor or its support. This connection may be a link E, having at each end a ball to be received and held in a suitable socket in the arm D' and the arm F' on the motor; or I may use a cylinder E', fitting a cylindrical transverse slot in the arm D' and containing a transverse cylindrical hole which allows the cylinder to oscillate and slide back and forth on the stud F², projecting from the motor; or the arm D' may rise to the level of the truck-frame G and be attached thereto. The motor is elastically supported on the transverse bar H of the truck through the medium of elastic cushions H', placed above and below said bar H and under lugs *f* on the motor.

In order to connect together flexibly yet positively the pinion B' or other driven portion on the axle and the driving-shaft of the motor F, I provide a yielding clutch consisting of radial arms secured to the pinion-hub and similar arms secured to the driving-shaft, one set of arms entering between those of the other set and held yieldingly in position by elastic cushions inserted between them.

In the drawings I have shown the arms I integral with a circular back plate I', and both sets of arms are cored out for the sake of lightness. Around the periphery of one or both of the back plates I' runs a rim or flange I², wholly or partly inclosing the arms I and forming therewith two broad pockets between said arms. Into these pockets enter the arms on the other hub, and in the same pockets on each side of said arms are inserted the loose blocks of rubber J or other elastic substance or medium. These blocks do not fill the space between the two sets of arms, but have enough lost motion to permit the free movement of the motor F upon its elastic support H', and also allow for play due to eccentricity, want of alinement, or other requirement exisiting by reason of the relative movement of the driving and driven shafts.

In the operation of my device the arm D' keeps the driving and driven shafts approximately in line under the varying relative movements of the axle and motor, while the coupling allows sufficient angularity between the shafts to prevent any bending or breaking of the parts which compose the power-transmitting device.

Having thus described my invention, what I claim, and desire to secure by Letters Patent, is—

1. In a power-transmitting device, the combination with a shaft, of a gear mounted thereon, a bracket journaled on the shaft, a pinion carried by the bracket and meshing with the gear, a power-shaft, a flexible coupling between said shaft and the pinion, an arm on the bracket, and a connection between said arm and the support for the power-shaft permitting longitudinal movement between the power-shaft and the pinion, in the line of their axes, substantially as described.

2. In a power-transmitting device, the combination with a shaft of a gear mounted thereon, a bracket journaled on the shaft, a pinion on the bracket meshing with the gear, a power-shaft coupled flexibly with the pinion, an arm on the bracket, and a link having at each end a ball, one fitting into a socket on the arm, and the other into a socket on the support for the power-shaft, substantially as described.

3. In a power-transmitting device, the combination with a shaft, of a gear mounted thereon, a bracket journaled on the shaft, and carrying a cylindrical stud, a pinion journaled on said stud, an electric motor, a shaft driven by said motor and flexibly coupled with the pinion, an arm on the bracket, and a link having a ball at each end engaging suitable sockets in the arm and in the motor-frame, substantially as described.

4. In a power-transmitting device, a flexible coupling consisting of two disks, arms on said disks interlocking with each other, and elastic cushions interposed in but not filling the space between said arms, substantially as described.

5. In a power-transmitting device, a flexible coupling consisting of two disks, hollow arms on said disks, an inclosing flange on one or both of said disks, and rubber blocks fitting loosely in the pockets between the arms, substantially as described.

ELMER A. SPERRY.

Witnesses:
B. B. HULL,
C. L. HAYNES.